United States Patent
Mullette et al.

(10) Patent No.: US 7,247,238 B2
(45) Date of Patent: Jul. 24, 2007

(54) POLY(ETHYLENE CHLOROTRIFLUOROETHYLENE) MEMBRANES

(75) Inventors: Daniel Mullette, Toongabbie (AU); Heinz-Joachim Muller, Thornleigh (AU)

(73) Assignee: Siemens Water Technologies Corp., Lowell, MA (US)

( * ) Notice: Subject to any disclaimer, the term of this patent is extended or adjusted under 35 U.S.C. 154(b) by 0 days.

(21) Appl. No.: 10/914,640

(22) Filed: Aug. 9, 2004

(65) Prior Publication Data

US 2005/0098494 A1    May 12, 2005

Related U.S. Application Data

(63) Continuation of application No. PCT/AU03/00179, filed on Feb. 12, 2003.

(30) Foreign Application Priority Data

Feb. 12, 2002    (AU)   ...................... PS0466

(51) Int. Cl.
     *B01D 39/00*      (2006.01)
     *B01D 39/14*      (2006.01)
     *B01D 24/00*      (2006.01)
     *B01D 63/02*      (2006.01)

(52) U.S. Cl. .............. 210/500.36; 210/502.1; 210/500.27; 210/490; 264/49

(58) Field of Classification Search ........... 210/500.27, 210/500.36, 650, 500.23, 502.1, 490; 264/49, 264/127, 213, 175; 521/61; 204/296
See application file for complete search history.

(56) References Cited

U.S. PATENT DOCUMENTS

| | | | |
|---|---|---|---|
| 3,228,876 A | 1/1966 | Mahon | |
| 3,625,827 A | 12/1971 | Wildi et al. | |
| 3,693,406 A | 9/1972 | Tobin | |
| 3,708,071 A | 1/1973 | Crowley | |
| 3,876,738 A | 4/1975 | Marinaccio et al. | |
| 3,968,192 A | 7/1976 | Hoffman et al. | |
| 3,992,301 A | 11/1976 | Shippey et al. | |
| 3,993,816 A | 11/1976 | Baudet et al. | |
| 4,188,817 A | 2/1980 | Steigelmann et al. | |
| 4,192,750 A | 3/1980 | Elfes et al. | |

(Continued)

FOREIGN PATENT DOCUMENTS

DE      3904544 A      8/1990

(Continued)

OTHER PUBLICATIONS

Lloyd D R et al. *Microporous Membrane Formation Via Thermally Induced Phase Separation/Solid-Liquid Phase Separation* Journal of Membrane Science, (Sep. 15, 1990), pp. 239-261, vol. 52 No. 3, Elsevier Scientific Publishing Company, Amsterdam, NL.

(Continued)

*Primary Examiner*—Ana Fortuna

(57) ABSTRACT

Porous polymeric membranes including Halar (poly (ethylene chlorotrifluoroethylene)) and related compounds and the methods of production thereof which avoid the use of toxic solvents. Preferred solvents, coating agents and pore forming agents are citric acid ethyl ester or glycerol triacetate. The membranes may be in the form of a hollow fiber or flat sheet, and may include other agents to modify the properties of the membrane, such as the hydrophilic/hydrophobic balance. Leachable agents may also be incorporated into the membranes.

11 Claims, 6 Drawing Sheets

U.S. PATENT DOCUMENTS

| | | | |
|---|---|---|---|
| 4,193,780 A | 3/1980 | Cotton et al. | |
| 4,203,848 A | 5/1980 | Grandine, II | |
| 4,218,324 A | 8/1980 | Hartmann et al. | |
| 4,230,583 A | 10/1980 | Chiolle et al. | |
| 4,247,498 A | 1/1981 | Casttro | |
| 4,248,648 A | 2/1981 | Kopp | |
| 4,253,936 A * | 3/1981 | Leysen et al. | 204/296 |
| 4,302,336 A | 11/1981 | Kawaguchi et al. | |
| 4,340,479 A | 7/1982 | Pall | |
| 4,353,802 A | 10/1982 | Hara et al. | |
| 4,384,474 A | 5/1983 | Kowalski | |
| 4,385,150 A | 5/1983 | Miyake et al. | |
| 4,388,189 A | 6/1983 | Kawaguchi et al. | |
| 4,431,545 A | 2/1984 | Pall et al. | |
| 4,451,369 A | 5/1984 | Sekino et al. | |
| 4,511,471 A | 4/1985 | Müller | |
| 4,540,490 A | 9/1985 | Shibata et al. | |
| 4,547,289 A | 10/1985 | Okano et al. | |
| 4,609,465 A | 9/1986 | Miller | |
| 4,614,109 A | 9/1986 | Hoffman | |
| 4,623,670 A * | 11/1986 | Mutoh et al. | 521/61 |
| 4,629,563 A | 12/1986 | Wrasidlo | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis | |
| 4,656,865 A | 4/1987 | Callan | |
| 4,660,411 A | 4/1987 | Reid | |
| 4,670,145 A | 6/1987 | Edwards | |
| 4,673,507 A | 6/1987 | Brown | |
| 4,687,561 A | 8/1987 | Kunz | |
| 4,688,511 A | 8/1987 | Gerlach et al. | |
| 4,702,836 A * | 10/1987 | Mutoh et al. | 210/500.23 |
| 4,702,840 A | 10/1987 | Degen et al. | |
| 4,708,799 A * | 11/1987 | Gerlach et al. | 210/500.23 |
| 4,718,270 A | 1/1988 | Storr | |
| 4,744,240 A | 5/1988 | Reichelt | |
| 4,756,875 A | 7/1988 | Tajima et al. | |
| 4,763,612 A | 8/1988 | Iwanami | |
| 4,767,539 A | 8/1988 | Ford | |
| 4,775,471 A | 10/1988 | Nagai et al. | |
| 4,779,448 A | 10/1988 | Gogins | |
| 4,784,771 A | 11/1988 | Wathen et al. | |
| 4,793,932 A | 12/1988 | Ford et al. | |
| 4,797,187 A | 1/1989 | Davis et al. | |
| 4,797,211 A | 1/1989 | Ehrfeld et al. | |
| 4,810,384 A | 3/1989 | Fabre | |
| 4,812,235 A | 3/1989 | Seleman et al. | |
| 4,816,160 A | 3/1989 | Ford et al. | |
| 4,840,227 A | 6/1989 | Schmidt | |
| 4,846,970 A | 7/1989 | Bertelsen et al. | |
| 4,876,006 A | 10/1989 | Ohkubo et al. | |
| 4,876,012 A | 10/1989 | Kopp et al. | |
| 4,886,601 A | 12/1989 | Iwatsuka et al. | |
| 4,888,115 A | 12/1989 | Marinaccio et al. | |
| 4,904,426 A | 2/1990 | Lundgard et al. | |
| 4,921,610 A | 5/1990 | Ford et al. | |
| 4,931,186 A | 6/1990 | Ford et al. | |
| 4,935,143 A | 6/1990 | Kopp et al. | |
| 4,963,304 A | 10/1990 | Im et al. | |
| 4,968,733 A | 11/1990 | Müller et al. | |
| 4,999,038 A | 3/1991 | Lundberg | |
| 5,005,430 A | 4/1991 | Kibler et al. | |
| 5,015,275 A | 5/1991 | Beck et al. | |
| 5,024,762 A | 6/1991 | Ford et al. | |
| 5,043,113 A * | 8/1991 | Kafchinski et al. | 264/41 |
| 5,066,375 A | 11/1991 | Parsi et al. | |
| 5,066,401 A | 11/1991 | Muller et al. | |
| 5,066,402 A | 11/1991 | Anselme et al. | |
| 5,069,065 A | 12/1991 | Sprunt et al. | |
| 5,075,065 A * | 12/1991 | Effenberger et al. | 264/213 |
| 5,076,925 A | 12/1991 | Roesink et al. | |
| 5,079,272 A | 1/1992 | Allegrezza et al. | |
| 5,094,750 A | 3/1992 | Kopp et al. | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth et al. | |
| 5,137,631 A | 8/1992 | Eckman et al. | |
| 5,138,870 A | 8/1992 | Lyssy | |
| 5,151,191 A | 9/1992 | Sunaoka et al. | |
| 5,151,193 A | 9/1992 | Grobe et al. | |
| 5,158,721 A | 10/1992 | Allegrezza et al. | |
| 5,182,019 A | 1/1993 | Cote et al. | |
| 5,192,456 A | 3/1993 | Ishida et al. | |
| 5,194,149 A | 3/1993 | Selbie et al. | |
| 5,198,116 A | 3/1993 | Comstock et al. | |
| 5,198,162 A * | 3/1993 | Park et al. | 264/49 |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A | 9/1993 | Cote et al. | |
| 5,275,766 A | 1/1994 | Gadkaree et al. | |
| 5,297,420 A | 3/1994 | Gilliland et al. | |
| 5,320,760 A | 6/1994 | Freund et al. | |
| 5,353,630 A | 10/1994 | Soda et al. | |
| 5,361,625 A | 11/1994 | Ylvisaker | |
| 5,364,527 A | 11/1994 | Zimmerman et al. | |
| 5,389,260 A | 2/1995 | Hemp | |
| 5,396,019 A * | 3/1995 | Sartori et al. | 585/819 |
| 5,401,401 A | 3/1995 | Hickok | |
| 5,403,479 A | 4/1995 | Smith et al. | |
| 5,405,528 A | 4/1995 | Selbie et al. | |
| 5,411,663 A | 5/1995 | Johnson | |
| 5,417,101 A | 5/1995 | Weich | |
| 5,419,816 A | 5/1995 | Sampson et al. | |
| 5,451,317 A | 9/1995 | Ishida et al. | |
| 5,470,469 A | 11/1995 | Eckman | |
| 5,477,731 A | 12/1995 | Mouton | |
| 5,479,590 A | 12/1995 | Lin | |
| 5,480,553 A | 1/1996 | Yamamori et al. | |
| 5,525,220 A | 6/1996 | Yagi | |
| 5,531,848 A | 7/1996 | Brinda et al. | |
| 5,531,900 A | 7/1996 | Raghaven et al. | |
| 5,543,002 A | 8/1996 | Brinda et al. | |
| 5,554,283 A | 9/1996 | Brinda et al. | |
| 5,607,593 A | 3/1997 | Cote et al. | |
| 5,639,373 A | 6/1997 | Mahendran et al. | |
| 5,643,455 A | 7/1997 | Kopp et al. | |
| 5,647,988 A | 7/1997 | Kawanishi et al. | |
| D396,046 S | 7/1998 | Scheel et al. | |
| 5,783,083 A | 7/1998 | Henshaw et al. | |
| D396,726 S | 8/1998 | Sadr et al. | |
| D400,890 S | 11/1998 | Gambardella | |
| 5,906,742 A | 5/1999 | Wang et al. | |
| 5,910,250 A | 6/1999 | Mahendran et al. | |
| 5,914,039 A | 6/1999 | Mahendran | |
| 5,918,264 A | 6/1999 | Drummond et al. | |
| 5,942,113 A | 8/1999 | Morimura | |
| 5,944,997 A | 8/1999 | Pedersen et al. | |
| 5,958,243 A | 9/1999 | Lawrence et al. | |
| 5,988,400 A | 11/1999 | Karachevtcev et al. | |
| 6,024,872 A | 2/2000 | Mahendran | |
| 6,039,872 A | 3/2000 | Wu et al. | |
| 6,042,677 A | 3/2000 | Mahendran et al. | |
| 6,045,698 A | 4/2000 | Cote et al. | |
| 6,045,899 A | 4/2000 | Wang et al. | |
| 6,048,454 A | 4/2000 | Jenkins | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A | 8/2000 | Radovanovic et al. | |

| | | | | | | |
|---|---|---|---|---|---|---|
| 6,146,747 | A | 11/2000 | Wang et al. | EP | 407900 A2 | 1/1991 |
| 6,156,200 | A | 12/2000 | Zha et al. | EP | 395133 A1 | 2/1995 |
| 6,159,373 | A | 12/2000 | Beck et al. | EP | 463627 A2 | 5/1995 |
| 6,193,890 | B1 | 2/2001 | Pedersen et al. | EP | 492446 B1 | 11/1995 |
| 6,202,475 | B1 | 3/2001 | Selbie et al. | EP | 430082 A2 | 6/1996 |
| 6,214,231 | B1 | 4/2001 | Cote et al. | EP | 763758 A1 | 3/1997 |
| 6,221,247 | B1 | 4/2001 | Nemser et al. | EP | 911073 A1 | 4/1999 |
| 6,245,239 | B1 | 6/2001 | Cote et al. | EP | 492942 B1 | 2/2000 |
| 6,254,773 | B1 | 7/2001 | Biltoft | EP | 1 034 835 | 9/2000 |
| 6,264,839 | B1 | 7/2001 | Mohr et al. | EP | 1052012 A1 | 11/2000 |
| 6,277,512 | B1 | 8/2001 | Hamrock et al. | EP | 920904 A2 | 12/2000 |
| 6,280,626 | B1 | 8/2001 | Miyashita et al. | EP | 1 236 503 | 9/2002 |
| 6,284,135 | B1 | 9/2001 | Ookata | FR | 2620712 A1 | 3/1989 |
| 6,294,039 | B1 | 9/2001 | Mahendran et al. | FR | 2674448 A1 | 2/1992 |
| 6,299,773 | B1 | 10/2001 | Takamura et al. | GB | 702911 | 1/1954 |
| 6,315,895 | B1 | 11/2001 | Summerton et al. | GB | 2253572 A | 9/1992 |
| 6,322,703 | B1 | 11/2001 | Taniguchi et al. | JP | 55-129155 | 6/1980 |
| 6,325,928 | B1 | 12/2001 | Pedersen et al. | JP | 58-088007 A2 | 5/1983 |
| RE37,549 | E | 2/2002 | Mahendran et al. | JP | 61-097006 A2 | 5/1986 |
| 6,354,444 | B1 | 3/2002 | Mahendran | JP | 61-107905 A2 | 5/1986 |
| 6,375,848 | B1 | 4/2002 | Cote et al. | JP | S63-38884 | 7/1986 |
| 6,423,784 | B1 | 7/2002 | Hamrock et al. | JP | 61-192309 | 8/1986 |
| 6,440,303 | B2 | 8/2002 | Spriegel | JP | 61-257203 A2 | 11/1986 |
| D462,699 | S | 9/2002 | Johnson et al. | JP | 61-263605 A2 | 11/1986 |
| 6,495,041 | B2 | 12/2002 | Taniguchi et al. | JP | 62-004408 A2 | 1/1987 |
| 6,524,481 | B2 | 2/2003 | Zha et al. | JP | 62-114609 A2 | 5/1987 |
| 6,550,747 | B2 | 4/2003 | Rabie et al. | JP | 62-140607 A2 | 6/1987 |
| 6,555,005 | B1 | 4/2003 | Zha et al. | JP | 62-179540 A2 | 8/1987 |
| D478,913 | S | 8/2003 | Johnson et al. | JP | 62-250908 | 10/1987 |
| 6,620,319 | B2 | 9/2003 | Behmann et al. | JP | 63-097634 A2 | 4/1988 |
| 6,635,179 | B1 | 10/2003 | Summerton et al. | JP | 63-143905 | 6/1988 |
| 6,641,733 | B2 | 11/2003 | Zha et al. | JP | 01 307409 A2 | 12/1989 |
| 6,645,374 | B2 | 11/2003 | Cote et al. | JP | 02-031200 | 1/1990 |
| 6,721,529 | B2 | 4/2004 | Chen et al. | JP | 02-144132 A2 | 6/1990 |
| 6,727,305 | B1 * | 4/2004 | Pavez Aranguiz ......... 524/423 | JP | 02-164423 A2 | 6/1990 |
| 6,770,202 | B1 * | 8/2004 | Kidd et al. ................ 210/650 | JP | 02-284035 A2 | 11/1990 |
| 6,790,912 | B2 | 9/2004 | Blong | JP | 03-018373 A2 | 1/1991 |
| 6,811,696 | B2 | 11/2004 | Wang et al. | JP | 03-028797 A2 | 2/1991 |
| 6,884,350 | B2 | 4/2005 | Muller | JP | 03-110445 A2 | 5/1991 |
| 6,884,375 | B2 | 4/2005 | Wang et al. | JP | 04-250898 | 9/1992 |
| 6,890,435 | B2 | 5/2005 | Ji et al. | JP | 04-265128 | 9/1992 |
| 6,890,645 | B2 | 5/2005 | Disse et al. | JP | 04-310223 A2 | 11/1992 |
| 6,893,568 | B1 | 5/2005 | Janson et al. | JP | 05-023557 A2 | 2/1993 |
| 6,974,554 | B2 | 12/2005 | Cox et al. | JP | 05-096136 | 4/1993 |
| 6,994,867 | B1 | 2/2006 | Hossainy et al. | JP | 05-157654 A2 | 6/1993 |
| 2002/0148767 | A1 | 10/2002 | Johnson et al. | JP | 05-285348 | 11/1993 |
| 2002/0153299 | A1 | 10/2002 | Mahendran et al. | JP | 06-071120 A2 | 3/1994 |
| 2002/0195390 | A1 | 12/2002 | Zha et al. | JP | 06-114240 A2 | 4/1994 |
| 2003/0075504 | A1 | 4/2003 | Zha et al. | JP | 06-218237 | 8/1994 |
| 2003/0089659 | A1 | 5/2003 | Zha et al. | JP | 06-285496 | 10/1994 |
| 2003/0136746 | A1 | 7/2003 | Behman et al. | JP | 06-343837 | 12/1994 |
| 2003/0141248 | A1 | 7/2003 | Mahendran et al. | JP | 07-000770 A2 | 1/1995 |
| 2003/0164332 | A1 | 9/2003 | Mahendran et al. | JP | 07-024272 | 1/1995 |
| 2003/0178365 | A1 | 9/2003 | Zha et al. | JP | 07-155758 | 6/1995 |
| 2003/0205519 | A1 | 11/2003 | Zha et al. | JP | 07-185268 | 7/1995 |
| 2003/0226797 | A1 | 12/2003 | Phelps | JP | 07-185271 | 7/1995 |
| 2003/0234221 | A1 | 12/2003 | Johnson et al. | JP | 07-275665 A2 | 10/1995 |
| 2004/0000520 | A1 | 1/2004 | Gallagher et al. | JP | 08-010585 A2 | 1/1996 |
| 2004/0035782 | A1 | 2/2004 | Muller | JP | 09-141063 A2 | 6/1997 |
| 2004/0084369 | A1 | 5/2004 | Zha et al. | JP | 09-220569 | 8/1997 |
| 2004/0145076 | A1 | 7/2004 | Zha et al. | JP | 09-324067 | 12/1997 |
| 2004/0191894 | A1 | 9/2004 | Muller et al. | JP | 10-156149 A2 | 6/1998 |
| 2004/0217053 | A1 | 11/2004 | Zha et al. | JP | 11-165200 | 6/1999 |
| | | | | JP | 2000-342932 | 12/2000 |
| | | FOREIGN PATENT DOCUMENTS | | WO | WO 88/06200 | 8/1988 |
| | | | | WO | WO 90/00434 | 1/1990 |
| DE | | 4117281 A | 1/1992 | WO | WO 93/02779 | 2/1993 |
| DE | | 4113420 A | 10/1992 | WO | WO 93/15827 | 8/1993 |
| DE | | 4117422 A | 11/1992 | WO | WO 9607470 A1 | 3/1996 |
| DE | | 29906389 | 6/1999 | WO | WO 96/41676 | 12/1996 |
| EP | | 12557 B1 | 2/1983 | WO | WO 98/22204 | 5/1998 |
| EP | | 50447 A1 | 10/1985 | WO | WO 98/28066 | 7/1998 |
| EP | | 250337 A1 | 12/1987 | WO | WO 99/01207 A1 | 1/1999 |

| WO | WO 99/59707 | 11/1999 |
| WO | WO 01/36075 | 5/2001 |

OTHER PUBLICATIONS

Patent Abstracts of Japan, vol. 016, No. 501, Oct. 16, 1992, and JP 04 187224 A (Mitsubishi Rayon Co Ltd), Jul. 3, 1992, And Database WPI Section Ch, Week 199233 Derwent Publication Ltd., London, GB, Class A18, AN 1992-273715 XP002311766.

Ramaswammy S. et al. *Fabrication of Ply (ECTFE) Membranes via thermally induced phase Separation*, Journal of Membrane Science, (Dec. 1, 2002), pp. 175-180, vol. 210 No. 1, Scientific Publishing Company, Amsterdam, NL.

European Search Report in European Appl. No. 03 73 9399, completed Dec. 22, 2004.

Almulla et al., *Desalination*, 153 (2002), pp. 237-243.

Cote et al., *Wat. Sci. Tech.* 38(4-5), 1998, pp. 437-442.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Lozier et al., "Demonstration Testing of ZenonGem and Reverse Osmosis for Indirect Potable Reuse Final Technical Report," published by CH2M Hill, available from the National Technical Information Service, Operations Division, Jan. 2000, entire publication.

Rosenberger et al., *Desalination*, 151 (2002), pp. 195-200.

Ueda et al., "Effects of Aeration on Suction Pressure in a Submerged Membrane Bioreactor," *Wat. Res.* vol. 31, No. 3, 1997, pp. 489-494.

White et al., *The Chemical Engineering Journal*, 52, 1993, pp. 73-77.

Zenon, "Proposal for ZeeWeed® Membrane Filtration Equipment System for the City of Westminster, Colorado, Proposal No. 479-99," Mar. 2000, entire publication.

RD 420013 (Anonymous), Apr. 1999.

\* cited by examiner

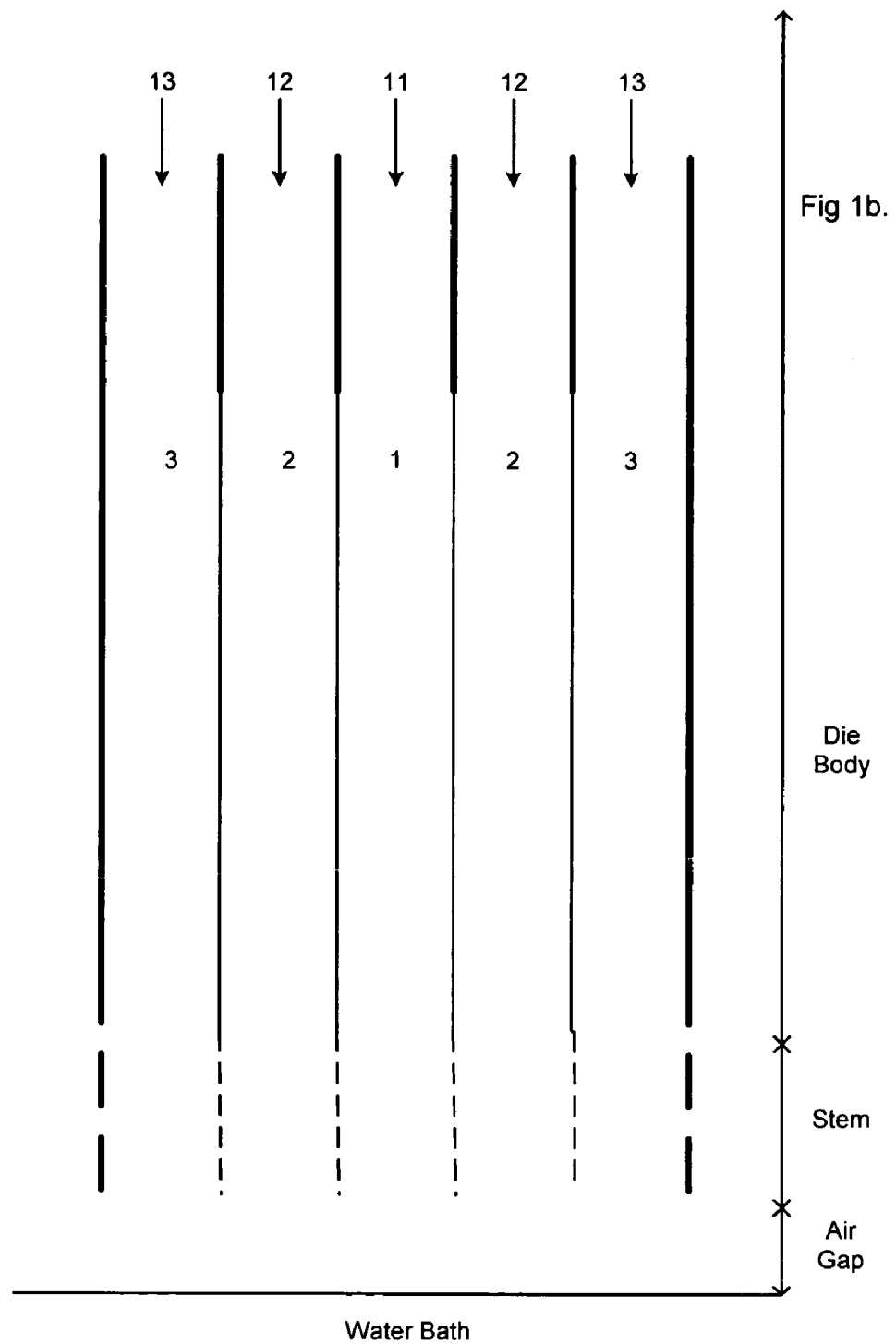

Figure 5

Halar Trials Summary

| Sample | %polymer | Solvent | Dope Flow (cc/min) | Lumen | Lumen Flow (cc/min) | Stem length | Coating | Coating Flow (cc/min) | Hauloff (m/min) | Quench Fluid | OD (um) | ID (um) | WT (um) | WT:OD Ratio | Permeability (LMH) | %BE | BF(N) | BP(kPa) | Stress (Mpa) |
|---|---|---|---|---|---|---|---|---|---|---|---|---|---|---|---|---|---|---|---|
| 1 | 21 | GTA | 22 | Digol | 5 | none | none | nom | 35 | Water | 856 | 469 | 193.5 | 0.23 | - | - | | | |
| 2 | 21 | GTA | 22 | Digol | 5 | Short | GTA | 10 | 35 | Water | 766 | 461 | 152.5 | 0.20 | 2294 | 92.9 | 1.35 | 486 | 4.6 |
| 3 | 21 | GTA | 22 | Digol | 5 | Short | GTA | 10 | 60 | Water | 775 | 481 | 147 | 0.19 | 2193 | 95.1 | 1.27 | 492 | 4.38 |
| 4 | 21 | GTA | 35 | Digol | 5 | Long | Citroflex 2 | 10 | 35 | Water | 914 | 445 | 234.5 | 0.26 | | | | | |
| 5 | 21 | GTA | 22 | Digol | 5 | Long | Citroflex 2 | 10 | 35 | Water | 802 | 486 | 158 | 0.20 | | | | | |

POLY(ETHYLENE CHLOROTRIFLUOROETHYLENE) MEMBRANES

RELATED APPLICATIONS

This application is a continuation, under 35 U.S.C. § 120, of International Patent Application No. PCT/AU03/00179, filed on Feb. 12, 2003 under the Patent Cooperation Treaty (PCT), which was published by the International Bureau in English on Aug. 21, 2003, which designates the United States, and which claims the benefit of Australian Provisional Patent Application No. PS 0466, filed Feb. 12, 2002.

FIELD OF THE INVENTION

The invention relates to Halar (ethylene chlorotrifluoroethylene copolymer, or poly (ethylene chlorotrifluoroethylene)) and related membranes for use in ultrafiltration and microfiltration and in particular to membranes in the form of hollow fibres, and to methods of preparing said membranes.

BACKGROUND OF THE INVENTION

The following discussion is not to be construed as an admission with regard to the common general knowledge in Australia.

Synthetic polymeric membranes are well known in the field of ultrafiltration and microfiltration for a variety of applications including desalination, gas separation, filtration and dialysis. The properties of the membranes vary depending on the morphology of the membrane i.e. properties such as symmetry, pore shape, pore size and the chemical nature of the polymeric material used to form the membrane.

Different membranes can be used for specific separation processes, including microfiltration, ultrafiltration and reverse osmosis. Microfiltration and ultrafiltration are pressure driven processes and are distinguished by the size of the particle or molecule that the membrane is capable of retaining or passing. Microfiltration can remove very fine colloidal particles in the micrometer and submicrometer range. As a general rule, microfiltration can filter particles down to 0.05 µm, whereas ultrafiltration can retain particles as small as 0.01 µm and smaller. Reverse Osmosis operates on an even smaller scale.

Microporous phase inversion membranes are particularly well suited to the application of removal of viruses and bacteria.

A large surface area is needed when a large filtrate flow is required. A commonly used technique to minimize the size of the apparatus used is to form a membrane in the shape of a hollow porous fibre. A large number of these hollow fibres (up to several thousand) are bundled together and housed in modules. The fibres act in parallel to filter a solution for purification, generally water, which flows in contact with the outer surface of all the fibres in the module. By applying pressure, the water is forced into the central channel, or lumen, of each of the fibres while the microcontaminants remain trapped outside the fibres. The filtered water collects inside the fibres and is drawn off through the ends.

The fibre module configuration is a highly desirable one as it enables the modules to achieve a very high surface area per unit volume.

In addition to the arrangement of fibres in a module, it is also necessary for the polymeric fibres themselves to possess the appropriate microstructure to allow microfiltration to occur.

Desirably, the microstructure of ultrafiltration and microfiltration membranes is asymmetric, that is, the pore size gradient across the membrane is not homogeneous, but rather varies in relation to the cross-sectional distance within the membrane. Hollow fibre membranes are preferably asymmetric membranes possessing tightly bunched small pores on one or both outer surfaces and larger more open pores towards the inside edge of the membrane wall.

This microstructure has been found to be advantageous as it provides a good balance between mechanical strength and filtration efficiency.

As well as the microstructure, the chemical properties of the membrane are also important. The hydrophilic or hydrophobic nature of a membrane is one such important property.

Hydrophobic surfaces are defined as "water hating" and hydrophilic surfaces as "water loving". Many of the polymers used to cast porous membranes are hydrophobic polymers. Water can be forced through a hydrophobic membrane by use of sufficient pressure, but the pressure needed is very high (150–300 psi), and a membrane may be damaged at such pressures and generally does not become wetted evenly.

Hydrophobic microporous membranes are typically characterised by their excellent chemical resistance, biocompatibility, low swelling and good separation performance. Thus, when used in water filtration applications, hydrophobic membranes need to be hydrophilised or "wet out" to allow water permeation. Some hydrophilic materials are not suitable for microfiltration and ultrafiltration membranes that require mechanical strength and thermal stability since water molecules can play the role of plasticizers.

Currently, poly(tetrafluoroethylene) (PTFE), polyethylene (PE), polypropylene (PP) and poly(vinylidene fluoride) (PVDF) are the most popular and available hydrophobic membrane materials. PVDF exhibits a number of desirable characteristics for membrane applications, including thermal resistance, reasonable chemical resistance (to a range of corrosive chemicals, including sodium hypochlorite), and weather (UV) resistance.

While PVDF has to date proven to be the most desirable material from a range of materials suitable for microporous membranes, the search continues for membrane materials which will provide better chemical stability and performance while retaining the desired physical properties required to allow the membranes to be formed and worked in an appropriate manner.

In particular, a membrane is required which has a superior resistance (compared to PVDF) to more aggressive chemical species, in particular, oxidising agents and to conditions of high pH i.e. resistance to caustic solutions. In particular with water filtration membranes, chlorine resistance is highly desirable. Chlorine is used to kill bacteria and is invariably present in town water supplies. Even at low concentrations, a high throughput of chlorinated water can expose membranes to large amounts of chlorine over the working life of a membrane can lead to yellowing or brittleness which are signs of degradation of the membrane.

Microporous synthetic membranes are particularly suitable for use in hollow fibres and are produced by phase inversion. In this process, at least one polymer is dissolved in an appropriate solvent and a suitable viscosity of the solution is achieved. The polymer solution can be cast as a film or hollow fibre, and then immersed in precipitation bath such as water. This causes separation of the homogeneous polymer solution into a solid polymer and liquid solvent phase. The precipitated polymer forms a porous structure containing a network of uniform pores. Production parameters that affect the membrane structure and properties include the polymer concentration, the precipitation media and temperature and the amount of solvent and non-solvent in the polymer solution. These factors can be varied to produce microporous membranes with a large range of pore sizes (from less than 0.1 to 20 μm), and possess a variety of chemical, thermal and mechanical properties.

Hollow fibre ultrafiltration and microfiltration membranes are generally produced by either diffusion induced phase separation (the DIPS process) or by thermally induced phase separation (the TIPS process).

Determining the appropriate conditions for carrying out the TIPS process is not simply a matter of substituting one polymer for another. In this regard, casting a polymeric hollow fibre membrane via the TIPS process is very different to casting or extruding a bulk item from the same material. The TIPS procedure is highly sensitive, each polymer requiring careful selection of a co-solvent, a non-solvent, a lumen forming solvent or non-solvent, a coating solvent or non-solvent and a quench, as well as the appropriate production parameters, in order to produce porous articles with the desired chemically induced microstructure in addition to the overall extruded high fibre structure.

The TIPS process is described in more detail in PCT AU94/00198 (WO 94/17204) AU 653528, the contents of which are incorporated herein by reference.

The quickest procedure for forming a microporous system is thermal precipitation of a two component mixture, in which the solution is formed by dissolving a thermoplastic polymer in a solvent which will dissolve the polymer at an elevated temperature but will not do so at lower temperatures. Such a solvent is often called a latent solvent for the polymer. The solution is cooled and, at a specific temperature which depends upon the rate of cooling, phase separation occurs and the polymer rich phase separates from the solvent.

All practical thermal precipitation methods follow this general process which is reviewed by Smolders et al in Kolloid Z.u.Z Polymer, 43, 14–20 (1971). The article distinguishes between spinodal and binodal decomposition of a polymer solution.

The equilibrium condition for liquid-liquid phase separation is defined by the binodal curve for the polymer/solvent system. For binodal decomposition to occur, the solution of a polymer in a solvent is cooled at an extremely slow rate until a temperature is reached below which phase separation occurs and the polymer rich phase separates from the solvent.

It is more usual for the phases not to be pure solvent and pure polymer since there is still some solubility of the polymer in the solvent and solvent in the polymer, there is a polymer rich phase and a polymer poor phase. For the purposes of this discussion, the polymer rich phase will be referred to as the polymer phase and the polymer poor phase will be referred to as the solvent phase.

When the rate of cooling is comparatively fast, the temperature at which the phase separation occurs is generally lower than in the binodal case and the resulting phase separation is called spinodal decomposition.

According to the process disclosed in U.S. Pat. No. 4,247,498, the relative polymer and solvent concentrations are such that phase separation results in fine droplets of solvent forming in a continuous polymer phase. These fine droplets form the cells of the membrane. As cooling continues, the polymer freezes around the solvent droplets.

As the temperature is lowered, these solubilities decrease and more and more solvent droplets appear in the polymer matrix. Syneresis of the solvent from the polymer results in shrinkage and cracking, thus forming interconnections or pores between the cells. Further cooling sets the polymer. Finally, the solvent is removed from the structure.

Known thermal precipitation methods of porous membrane formation depend on the polymer rich phase separating from the solvent followed by cooling so that the solidified polymer can then be separated from the solvent. Whether the solvent is liquid or solid when it is removed from the polymer depends on the temperature at which the operation is conducted and the melting temperature of the solvent.

True solutions require that there be a solvent and a solute. The solvent constitutes a continuous phase and the solute is uniformly distributed in the solvent with no solute-solute interaction. Such a situation is almost unknown with the polymer solutions. Long polymer chains tend to form temporary interactions or bonds with other polymer chains with which they come into contact. Polymer solutions are thus rarely true solutions but lie somewhere between true solutions and mixtures.

In many cases it is also difficult to state which is the solvent and which is the solute. In the art, it is accepted practice to call a mixture of polymer and solvent a solution if it is optically clear without obvious inclusions of either phase in the other. By optically clear, the skilled artisan will understand that polymer solutions can have some well known light scattering due to the existence of large polymer chains. Phase separation is then taken to be that point, known as the cloud point, where there is an optically detectable separation. It is also accepted practice to refer to the polymer as the solute and the material with which it is mixed to form the homogeneous solution as the solvent.

In the present case the inventors have sought to find a way to prepare Halar membranes without the use of highly toxic solvents, and in particular, to prepare hollow fibre Halar membranes. Halar, or poly (ethylene chlorotrifluoroethylene), is a 1:1 alternating copolymer of ethylene and chlorotrifluoroethylene, and having the following structure:

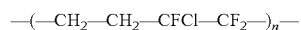

While the embodiments of the invention are described herein with respect to Halar, this term is used herein to encompass Halar equivalents, such as

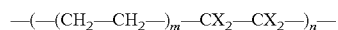

wherein each X is independently selected from F or Cl, and where m is chosen so as to be between 0 and 1, so as to allow the ethylene portion of the polymer to range from 0 to 50%. An example of a Halar equivalent is PCTFE.

It has been known for some time to produce flat sheet Halar membranes, and the processes are disclosed in U.S. Pat. No. 4,702,836, for example. The previous methods were not amenable to producing hollow fibres and moreover, utilised solvents which are highly toxic with high environmental impact, such as 1,3,5-trichlorobenzene, dibutyl phthalate and dioctyl phthalate.

The properties of Halar make it highly desirable in the field of ultrafiltration and microfiltration. In particular, Halar has extremely good properties in relation to its resistance both to chlorine and to caustic solutions, but also to ozone and other strong oxidising agents. While these desiderata have been established for some time, it was hitherto unknown how to fulfil the long felt need to make hollow fibre membranes from such a desirable compound. Further, a disadvantage in relation to the existing prepararatory methods for Halar flat sheet membranes is that they require the use of highly toxic solvents or solvents that are of dubious safety at the very least. For instance, the conventional state of the art is that the solvents needed are aromatic solvents such as dibutyl phthalate (DBP), dioctyl phthalate (DOP) and 1,3,5-trichlorobenzene (TCB). Such difficult solvents are required due to the chemical stability of Halar and its resistance to most common solvents below 150° C.

It is an object of the present invention to overcome or ameliorate at least one of the disadvantages of the prior art, or to provide a useful alternative, particularly in terms of methods of production.

SUMMARY OF THE INVENTION

According to a first aspect, the invention provides a porous polymeric membrane including Halar and formed without the use of toxic solvents, or solvents of dubious or unproven safety.

The membranes may be preferably flat sheet, or, more preferably hollow fibres.

Preferably, the porous polymeric membrane is formed by the TIPS (thermally induced phase separation) process and has an asymmetric pore size distribution. Most preferably, the Halar ultrafiltration or microfiltration membrane has an asymmetric cross section, a large-pore face and a small-pore face.

Preferably, the porous polymeric Halar membrane has pore size is in the range 0.01 µm to 20 µm. Pore size can be determined by the so called bubble point method.

According to a second aspect, the invention provides a porous polymeric membrane formed from Halar and prepared from a solution containing one or more compounds according to formula I or formula II:

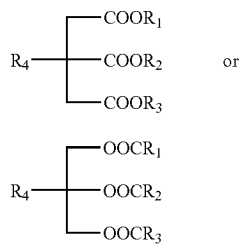

wherein $R_1$, $R_2$ and $R_3$ are independently methyl, ethyl, propyl, butyl, pentyl, hexyl or other alkyl.

$R_4$ is H, OH, $COR_5$, $OCOR_5$, methyl, ethyl, propyl, butyl, pentyl, hexyl or other alkyl, methoxy, ethoxy, propoxy, butoxy, pentoxy, hexoxy or other alkoxy, $R_5$ is methyl, ethyl, propyl, butyl, pentyl, hexyl or other alkyl.

Preferably, $R_1=R_2=R_3=$ethyl and $R_4=$H.

Preferably, the pore controlling agent is citric acid ethyl ester (Citroflex™-2) or glycerol triacetate.

The above compounds may be used as polymer solvents, coating agents or both, and may be used alone, in mixtures of the above compounds, or in conjunction with other appropriate agents.

The porous polymeric membranes of the present invention may include one or more materials compatible with the Halar.

The porous polymeric membranes ultrafiltration or microfiltration of the present invention may be either hydrophobic or hydrophilic, and may include other polymeric materials compatible with Halar. Additional species adapted to modify the chemical behaviour of the membrane may also be added. In one highly preferred alternative, the porous polymeric membrane of the present invention further including modifying agent to modify the hydrophilicity/hydrophobicity balance of the membrane. This can result in a porous polymeric membrane which is hydrophilic or alternatively, a porous polymeric membrane which is hydrophobic.

According to a third aspect, the invention provides a porous polymeric membrane formed from Halar and incorporating a leachable agent.

In one preferred embodiment, the leachable agent is silica.

Preferably, the silica is present in an amount of from 10 to 50 wt % of the final polymer, and more preferably around 30%. The silica may be hydrophobic silica or hydrophilic silica. Highly preferred are fumed silica's such as the hydrophilic Aerosil 200 and the hydrophobic Aerosil R972.

Preferably, the porous polymeric membranes of the present invention have one or more of the following properties: high permeability (for example, greater than 1000 LMH/hr@100 KPa), good macroscopic integrity, uniform wall thickness and high mechanical strength (for example, the breakforce extension is greater than 1.3N).

According to a fourth aspect, the present invention provides a method of making a porous polymeric material comprising the steps of: (a) heating a mixture comprising Halar and a solvent system initially comprising a first component that is a latent solvent for Halar and optionally a second component that is a non-solvent for Halar wherein, at elevated temperature, Halar dissolves in the solvent system to provide an optically clear solution, (b) rapidly cooling the solution so that non-equilibrium liquid-liquid phase separation takes place to form a continuous polymer rich phase and a continuous polymer lean phase with the two phases being intermingled in the form of bicontinuous matrix of large interfacial area, (c) continuing cooling until the polymer rich phase solidifies; and (d) removing the polymer lean phase from the solid polymeric material.

According to a fifth aspect, the invention provides a porous polymeric membrane formed from Halar and containing silica and wherein said polymeric porous Halar membrane has a coating of a coating agent including of one or more compounds according to formula I or II:

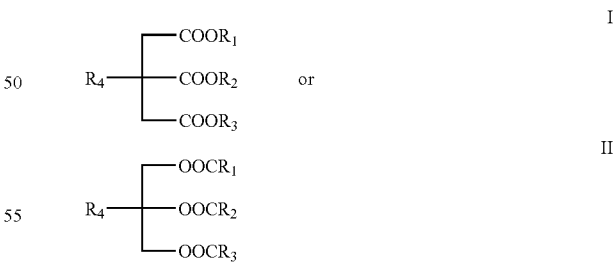

wherein $R_1$, $R_2$ and $R_3$ are independently methyl, ethyl, propyl, butyl, pentyl, hexyl or other alkyl.

$R_4$ is H, OH, $COR_5$, $OCOR_5$, methyl, ethyl, propyl, butyl, pentyl, hexyl or other alkyl, methoxy, ethoxy, propoxy, butoxy, pentoxy, hexoxy or other alkoxy.

$R_5$ is methyl, ethyl, propyl, butyl, pentyl, hexyl or other alkyl.

Preferably, $R_1=R_2=R_3=$ethyl and $R_4=$H.

Preferably, the pore controlling agent is an environmentally friendly solvent.

Preferably, the pore controlling agent is citric acid ethyl ester (Citroflex™-2) or glycerol triacetate.

According to a sixth aspect, the invention provides a method of manufacturing a microfiltration or ultrafiltration membrane including the step of casting a membrane from a polymer composition including Halar.

According to a seventh aspect, the invention provides a method of forming a hollow fibre Halar membrane comprising: forming a blend of Halar with a compatible solvent; forming said blend into a shape to provide a hollow fibre; contacting an internal lumen surface of said blend with a lumen forming fluid; inducing thermally induced phase separation in said blend to form a hollow fibre membrane; and removing the solvent from the membrane.

Preferably, the Halar is present in the blend in an amount ranging from 14–25%, and most preferably around 16–23%. Preferably, the pore controlling agent is an environmentally friendly solvent, such as GTA or Citroflex 2. Preferably, the lumen forming fluid is digol. In highly preferred embodiments, the process is conducted at elevated temperatures, preferably above 200° C., and more preferably above 220° C.

According to an eighth aspect, the invention provides a method of forming a hollow fibre Halar membrane comprising: forming a blend of Halar with a compatible solvent; forming said blend into a shape to provide a hollow fibre; contacting an external surface of said blend with a coating fluid; contacting an internal lumen surface of said blend with a lumen forming fluid; inducing thermally induced phase separation in said blend to form a hollow fibre membrane; and extracting the solvent from the membrane.

Preferably, the coating is selected from one or more of GTA, citroflex-2 and digol.

According to an ninth aspect, the invention provides a method of forming a hollow fibre Halar membrane comprising: forming a blend of Halar with a compatible solvent; suspending a pore forming agent in said blend; forming said blend into a shape to provide a hollow fibre; contacting an internal lumen surface of said blend with a lumen forming fluid; inducing thermally induced phase separation in said blend to form a hollow fibre membrane; and extracting the solvent from the membrane.

Preferably, the pore forming agent is a leachable pore forming agent, such as silica.

According to a tenth aspect, the invention provides a method of forming a hollow fibre Halar membrane comprising: forming a blend of Halar with a compatible solvent; suspending a pore forming agent in said blend; forming said blend into a shape to provide a hollow fibre; contacting an external surface of said blend with a coating fluid; contacting an internal lumen surface of said blend with a lumen forming fluid; inducing thermally induced phase separation in said blend to form a hollow fibre membrane; and extracting the solvent from the membrane.

Preferably the pore forming agent is a leachable pore forming agent, more preferably silica. The method may further include the step of leaching said leachable pore forming agent from said membrane. Preferably, the pore forming agent is a leachable silica, which is leached from the dope by caustic solution.

In certain preferred embodiments, the digol is used as a non-solvent and independently water is used as a quench fluid.

According to an eleventh aspect, the invention provides a method of forming a hollow fibre Halar membrane comprising: forming a blend of Halar with a compatible solvent; suspending a leachable pore forming agent in said blend; forming said blend into a shape to provide a hollow fibre; contacting an internal lumen surface of said blend with a lumen forming fluid; inducing thermally induced phase separation in said blend to form a hollow fibre membrane; extracting the solvent from the membrane; and leaching said leachable pore forming agent from said membrane.

According to a twelfth aspect, the invention provides a method of forming a hollow fibre Halar membrane comprising: forming a blend of Halar with a compatible solvent; suspending a leachable pore forming agent in said blend; forming said blend into a shape to provide a hollow fibre; contacting an external surface of said blend with a coating fluid; contacting an internal lumen surface of said blend with a lumen forming fluid; inducing thermally induced phase separation in said blend to form a hollow fibre membrane; extracting the solvent from the membrane; and leaching said leachable pore forming agent from said membrane.

Preferably, the pore forming agent is a leachable pore forming agent, such as silica, which is leached from the dope by caustic solution, preferably 5 wt %.

Preferably, digol is used as a non-solvent and independently water is used as a quench fluid.

According to a thirteenth aspect, the present invention provides the use of Halar for forming a hollow fibre ultrafiltration or microfiltration membrane.

According to a fourteenth aspect, the present invention provides method of forming a polymeric ultrafiltration or microfiltration membrane including the steps of: preparing a leachant resistant Halar membrane dope; incorporating a leachable pore forming agent into the dope; casting a membrane; and leaching said leachable pore forming agent from said membrane with said leachant.

Preferably, the leachable pore forming agent is an inorganic solid with an average particle size less than 1 micron, and most preferably is leachable silica. In highly preferred embodiments, the silica is present in around 3–9%.

Preferably, the leachant is a caustic solution.

The invention also provides a porous polymeric Halar microfiltration or ultrafiltration membrane when prepared by any of the preceding aspects.

According to a fifteenth aspect, the invention provides a microporous Halar membrane prepared from an environmentally friendly solvent or mixture of environmentally friendly solvents.

Preferably, the membrane is a flat sheet or hollow fibre membrane.

Preferably, the flat sheet membrane is prepared from an environmentally friendly solvent or mixture of solvents containing one or more compounds according to the following formula:

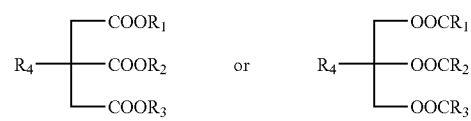

wherein $R_1$, $R_2$ and $R_3$ are independently methyl, ethyl, propyl, butyl, pentyl, hexyl or other alkyl.

$R_4$ is H, OH, $COR_5$, $OCOR_5$, methyl, ethyl, propyl, butyl, pentyl, hexyl or other alkyl, methoxy, ethoxy, propoxy, butoxy, pentoxy, hexoxy or other alkoxy.

$R_5$ is methyl, ethyl, propyl, butyl, pentyl, hexyl or other alkyl.

Preferably, $R_1=R_2=R_3=$ethyl and $R_4=$H.

Preferably, the pore controlling agent is citric acid ethyl ester (Citroflex™-2) or glycerol triacetate.

The term "environmentally friendly" as used herein refers to materials having a lesser or reduced effect on human health and the environment when compared with competing products or services that serve the same purpose. In particular, "environmentally friendly" refers to materials which have low toxicity to plants and animals, especially humans. Environmentally friendly also encompasses biodegradable materials.

Preferably, the environmentally friendly solvents used in the present invention are not recognised as hazardous to the health of humans or other organisms, either when subject exposure is acute (short term/high dose) or long term (typically at a lower dose).

It is preferable, that the acute toxicity be low, ie it is preferable if the solvents have a high LD50. For example, the LD50 of glycerol triacetate in rodents is around 3000 mg/kg bodyweight, whereas in the case of 1,3,5-trichlorobenzene, the LD50 is as low as 300–800 mg/kg. Preferably in the present invention, the LD50 is above 1000 mg/kg, and more preferably above 2000 mg/kg.

However, as well as acute toxicity, it is also highly desirable that the solvents do not show long term, low level exposure effects, and are not carcinogenic, mutagenic or teratogenic. This will not so much be reflected by their LD50's (although these are a factor), but reflects factors such as the ability of the solvent to bioaccumulate as well as its inherent toxic and mutagenic properties. Preferably, the solvents of the present invention do not bioaccumulate. In this regard, the biodegradability of the solvent is important, and high biodegradability is preferred.

It is also necessary to consider other ecotoxicological effects such as the toxicity to non-humans/non-mammals, and factors such as whether the solvent is an ozone depleting compound.

In terms of structural considerations, the type of structural features which may be found in suitable environmentally friendly solvents include the presence of degradable groups, eg hydrolysable groups, such as esters, (especially when these result in much smaller molecules, such as C4 or less); absence of halogens (such as chlorine); and the absence of aromatic rings. The preferred solvents of the present invention exhibit these three favourable characteristics.

BRIEF DESCRIPTION OF THE DRAWINGS

FIGS. 1a and 1b are diagrams of alternative TIPS processes used to prepare HF membranes

FIG. 5 is a summary of membrane production.

DETAILED DESCRIPTION OF THE PREFERRED EMBODIMENT

The TIPS process is described in more detail in PCT AU94/00198 (WO 94/17204) AU 653528, the contents of which are incorporated herein by reference. The current method used to prepare the membranes of the present invention is described herein in simplified form.

In one preferred form of the invention, poly (ethylene chlorotrifluoroethylene) is formed as a hollow fibre. The poly (ethylene chlorotrifluoroethylene) is dissolved in a suitable solvent and then passed through an annular coextrusion head.

Figure 1A:
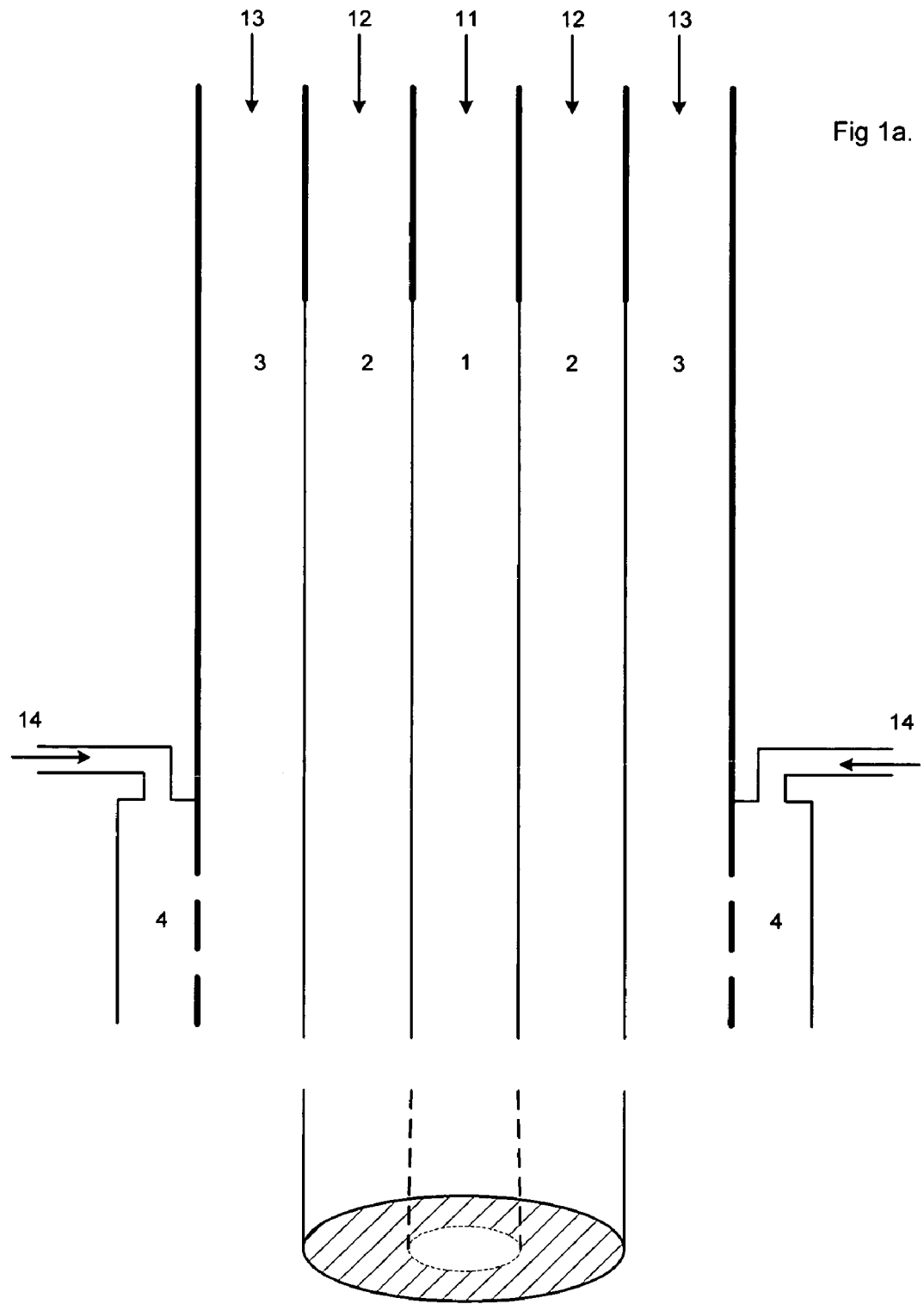

There are two possible ways to conduct the methods of the present invention in relation to hollow fibres. One is via a coextrusion head having three concentric passageways, as shown in cross section FIG. 1b, the other is via a quadruple co-extrusion head having four concentric passageways is shown in cross section in FIG. 1a. The principle is broadly the same in both cases, except for the way the quench fluid is contacted with the fibre.

In both cases, the axial passageway 1 may contain a lumen forming fluid 11. The first outwardly concentric passageway 2 contains a homogenous mixture of the polymer and solvent system 12 to form the membrane, the next outwardly concentric passageway 3 has a coating fluid 13. In the case of the triple extrusion head, the quench is a bath either directly adjacent the extrusion head or slightly spaced below it with an intermediate air gap. In the quadruple extrusion head, the outermost passageway 4 applies a quench fluid 14 to the fibre.

Under carefully thermally controlled conditions, the lumen forming fluid, the membrane forming solution and the coating fluid are coating fluid are contacted with a quench fluid at a predetermined temperature (and flow rate, if the quench is applied by means of an outermost concentric passageway). The poly (ethylene chlorotrifluoroethylene) solution comes into contact with the lumen forming fluid on the inside of the hollow fibre and with the coating fluid and/or quench bath solution on the outside of the hollow fibre.

The lumen and coating fluids contain one or more components of the solvent system, alone or in combination with other solvents, in selected proportions (the first component may be absent). The composition of the coating and lumen fluids predetermine the pore size and frequency of pores on the membrane surfaces.

Each fluid is transported to the extrusion head by means of individual metering pumps. The three components are individually heated and are transported along thermally insulated and heat traced pipes. The extrusion head has a number of temperature zones. The lumen fluid, membrane forming solution (dope) and coating fluid are brought to substantially the same temperature in a closely monitored temperature zone where the dope is shaped. As mentioned above, the exact nature of the quench depends on whether the quadruple or triple extrusion head is used. In the quadruple, the quench fluid is introduced via an outer concentric passageway. The fibre may travel down the quench tube at a significantly different linear speed from the quench fluid. The fibre may then pass into a further quantity of quenching fluid if desired.

In the triple extruder system, the fibre passes out of the die; which may be optionally in the shape of a stem to assist in determining fibre structure. The fibre may pass through an optional air gap before passing into a quench bath. Most fibres disclosed herein were prepared by the triple extrusion head, as will be clear by the inclusion of an air gap distance in the production parameters.

When the quench fluid is contacted with the dope, the dope undergoes non-equilibrium liquid-liquid phase separation to form a bicontinuous matrix of large interfacial area of two liquids in which the polymer rich phase is solidified before aggregated separation into distinct phases of small interfacial area can take place.

Preferably, any air, gas or vapour (not being a gas or vapour that serves as the lumen fluid), is excluded during extrusion and the fibre is stressed axially to stretch it by a factor ranging from 1.5 to 5, thereby elongating the surface pores.

The hollow fibre membrane leaves the extrusion head completely formed and there is no need for any further formation treatment except for removing the solvent system from the membrane in a post-extrusion operation that is common to membrane manufacturing process. In a preferred method, an appropriate solvent that does not dissolve the polymer but is miscible with the dope solvents is used to remove the solvent system for the polymer from the finished membrane.

The lumen forming fluid may be selected from a wide variety of substances such as are disclosed herein. The same substance may be used as the coating and quenching liquids. Water or virtually any other liquid may be used as the quench liquid. Water is used if a highly asymmetric structure is desired.

Asymmetric membranes can on rare occasions result from the TIPS process. The rate and speed of de-mixing occurs faster at the outer surface of the membrane and slower further away from the interface. This results in a pore size gradient with smaller pores at the surface and larger pores further inwards. The pores at the interface which in a hollow fibre are the outer layer of the fibre and the wall of the lumen may, in some circumstances, be so small that a "skin" region occurs. This is about one micron thick and is the critical region for filtration. Thus, the outside of the fibre is small pored whereas the centre of the polymeric region has large pore size.

The initial poly (ethylene chlorotrifluoroethylene) membrane trials were conducted by extrusion from small scale apparatus into a water quench, using either glycerol triacetate (GTA) or Citroflex 2 as the solvent. The structure of the membranes as observed by SEM appeared to be excellent, although there was some degree of skinning. The membrane prepared from Citroflex appeared the most promising and had a relatively open skin with a number of larger holes.

A poly (ethylene chlorotrifluoroethylene) membrane was prepared by extrusion in the manner described above for the TIPS process. The poly (ethylene chlorotrifluoroethylene) membranes were initially prepared without the use of a coating fluid, using GTA (Table 1) or citroflex2 (Table 2) as solvent.

TABLE 1

Uncoated Poly(Ethylene Chlorotrifluoroethylene) Membrane - GTA Solvent

| Parameter | Value |
| --- | --- |
| Solvent | 100% Glycerine Triacetate (GTA) |
| Lumen | 100% Digol |
| Poly (ethylene chlorotrifluoroethylene) Concentration | 24% |
| Barrel Temperature | 230° C. |
| Solvent injectors | 230° C. |
| Throughput | 100 cc/min |
| Screw speed | 250 rpm |
| Die Temperature | 212° C. |

The dope was completely clear and homogeneous, indicating complete solubility of the Halar in the GTA at 230° C. The dope solidified under ambient conditions after approx. 5 seconds. The fibre was extruded through a die at a temperature of 212° C. into a water quench. The air gap was approximately 15 mm and the lumen forming liquid was diethylene glycol (digol).

Selecting a die temperature which is too low can lead to pulsing of the fibre and blockages in the die. Halar melts at 240° C. and dissolves in GTA between 210° C. and 220° C. with a cloud point around 215° C. The solvent was varied to Citroflex 2 as per Table 2.

TABLE 2

Uncoated Poly(Ethylene Chlorotrifluoroethylene) Membrane - Citroflex 2 Solvent

| Parameter | Value |
| --- | --- |
| Solvent | 100% Citroflex 2 |
| Lumen | 100% Digol |
| poly (ethylene chlorotrifluoroethylene) Concentration | 24% |
| Barrel Temperature | 230° C. |
| Solvent injectors | 230° C. |
| Throughput | 100 cc/min |
| Screw speed | 250 rpm |
| Die Temperature | 212° C. |

The dope was completely clear and homogeneous as with the GTA mixture, indicating complete solubility of the polymer in Citroflex 2 at 230° C. The dope had a consistency slightly better than that of the GTA dope and also solidified under ambient conditions after approx. 5 seconds.

When Citroflex 2 was used as the solvent, it was necessary to add extra heat to the die to raise the temperature to sufficient levels to prevent blockages. The fibre was eventually extruded through a die at a temperature of approx. 212° C. into a water quench. The air gap was approximately 15 mm and the lumen liquid was diethylene glycol (digol).

The SEMs showed the structure of the surface and of the cross-section of both hollow fibre poly (ethylene chlorotrifluoroethylene) membranes prepared using GTA and Citroflex 2 to have adequate pore formation and structure. The fibres were also surprisingly strong and ductile, with a large degree of flexibility.

The procedure was further modified by the use of a coating on the outside of the fibre. The use of coating compositions in the preparation of the Halar membranes was found to enhance the permeability (2200 LMH) and improve the bubble point (490 kPa) of the resultant membranes. The process parameters are shown below in Table 3.

TABLE 3

Coated Poly(Ethylene Chlorotrifluoroethylene) Membrane - Various Solvents

| Parameter | Value | | |
| --- | --- | --- | --- |
| Solvent | GTA | | |
| Coating | GTA | Citroflex 2 | Digol |
| Lumen | 100% Digol | | |
| Polymer Concentration | 21% | | |
| Barrel Temperature | 230° C. | | |
| Solvent injectors | 230° C. | | |
| Throughput | 100 cc/min | | |
| Screw speed | 250 rpm | | |
| Die Temperature | 200° C. | | |

As previously, the dope was clear and homogeneous, was of a good consistency and solidified under ambient conditions after approx. 5 seconds. The fibre was extruded through a die at a temperature of approximately 200° C. into a water quench. The air gap was approximately 15 mm and the lumen liquid was diethylene glycol (digol).

It was necessary to ensure that the die temperature and a regular coating flow were maintained. Irregular flow was minimised or eliminated by degassing the coating and lumen vessels prior to use. Heated lines were installed for the coating and lumen fluids to help maintain die temperature. Extra insulation was also used, as maintaining an adequate temperature is required in order to produce a hollow poly (ethylene chlorotrifluoroethylene) fibre of consistent quality.

Two different trials were performed: GTA coating and Citroflex 2 coating. An uncoated sample was produced for comparison (Table 4).

TABLE 4

Coated Poly(Ethylene Chlorotrifluoroethylene) Hollow Fibre Membrane Performance

| Parameter | No Coating | GTA Coating | Citroflex 2 Coating |
|---|---|---|---|
| % poly (ethylene chlorotrifluoroethylene) | 21 | 21 | 21 |
| Coating Flow (cc/min) | 0 | 10 | 10 |
| Lumen Flow (cc/min) | 5 | 5 | 5 |
| Permeability (LMH @ 100 kPa) | — | 2294 | — |
| Bubble Point (kPa) | — | 490 | — |
| Break Extension (%) | — | 92.9 | — |
| Break Force (N) | — | 1.35 | — |
| Force/unit area (MPa) | — | 4.6 | — |
| Fibre OD/ID (μm) | 856/469 | 766/461 | — |

As was apparent from the SEMs of the sample, the sample with no coating had an impermeable skin, hence the absence of a result for permeability. The skin also has the effect of increasing break extension (BE) and break force (BF) artificially therefore these test were not performed either.

The results from the GTA coated samples showed that permeability was high, as was break extension and force. In some cases, the photograph of the cross section of the GTA coated sample showed some small "holes", probably caused by bubbles in the dope.

The high bubble point for the GTA sample indicates that many smaller pores rather than a smaller number of larger pores provide the high flow. The Citroflex 2 coated membrane can be seen in the SEM's to have a good pore structure.

In order to produce membranes with a controlled density surface skin and having a more hydrophilic nature, silica was added to the dope with the intention of subsequently leaching the silica out of the formed membrane matrix by the use of a caustic solution.

A hydrophilic silica, Aerosil R972 was tested as an additives to the poly (ethylene chlorotrifluoroethylene) membrane mixture. The dope was cast into a hollow fibre membrane, and the resultant hollow fibre membranes were quenched in water.

Once the membranes had been cast, a portion thereof was leached in a 5% aqueous caustic solution at room temperature for 14 hours.

After the membranes were cast, and prior to leaching, the membranes were examined using scanning electron microscopy. The structures were generally extremely promising with the surface of the sheets completely open and totally free of any skin.

The addition of the silica produced a hydrophilic membrane with a highly porous structure.

Subsequently placing the sample in caustic soda to leach the silica provided a dramatic opening up in the membrane structure even further. The result of the leaching was a change in the cross-section from a conglomerate-like structure to the more traditional lace or sponge-like formation. The leaching with caustic soda provided a membrane of good open structure.

The optimal dope for forming a TIPS poly (ethylene chlorotrifluoroethylene) polymer appears to be require the incorporation of 10–50 wt % silica relative to the polymer.

A number of hollow fibre membranes were prepared from the above dope. The wetting characteristics were as desired and the membrane structure showed an extremely open surface. While 3–6% silica was used in the present invention, it will be appreciated that the quantity can vary significantly without departing from the present inventive concept.

Leaching the silica from the membranes had increased effect on the permeability and pore size of the hollow fibres without altering the desirable physical properties of the membrane.

A long leaching time is not necessarily required and can be incorporated in the production process as a post-treatment of the final modular product. The leaching process can be carried out at any time, however there is an advantage to postponing the leaching process as long as possible, since any damage to the surface of the fibres during handling can be overcome by leaching which physically increases the porosity of the membrane.

SEM analysis of the membranes showed a high degree of asymmetry. Asymmetry is defined as a gradual increase in pore size throughout the membrane cross-section, such that the pores at one surface of the hollow fibre are larger than the other. In this case, the pore size increase was seen from the outer surface where the pores were smallest (and a quite dense surface layer was present) to the inner surface where the pores were significantly larger than those on the outer surface.

As well as silica, the leaching process allows for the introduction of other functionalities into the membrane, such as introducing hydrolysable esters to produce groups for anchoring functional species to membranes.

The leaching process has the capacity to maintain the hydrophilic character of a membrane after leaching. Again, without wishing to be bound by theory, the silica particles have a size in the order of nanometres so consequently the silica disperses homogeneously throughout the polymer solution. When the polymer is precipitated in the spinning process, there is a degree of encapsulation of the $SiO_2$ particles within the polymer matrix. Some of the particles (or the conglomerates formed by several silica particles) are wholly encapsulated by the precipitating polymer, some are completely free of any adhesion to the polymer (i.e. they lie in the pores of the polymer matrix) and some of the particles are partially encapsulated by the polymer so that a proportion of the particle is exposed to the 'pore' or to fluid transfer.

When contacted with caustic, it is believed that these particles will be destroyed from the accessible side, leaving that part of the particle in touch with the polymer matrix remaining. The remainder of the silica particle adheres to the polymer matrix by hydrophobic interaction and/or mechanical anchoring. The inside of the particle wall is hydrophilic because it consists of OH groups attached to silica. Because the silica is connected to hydrophobic groups on the other side, it cannot be further dissolved.

Thus when the membranes are treated with caustic solution, the free unencapsulated $SiO_2$ reacts to form soluble sodium silicates, while the semi-exposed particles undergo a partial reaction to form a water-loving surface (bearing in mind that given the opportunity, such particles would have dissolved fully). It is believed that the pores in the polymer matrix formed during the phase inversion stage yet filled with $SiO_2$ particles are cleaned out during leaching, giving a very open, hydrophilic membrane.

Poly (ethylene chlorotrifluoroethylene) Membranes incorporating 3% Aerosil R972 (fumed silica) into the membrane were prepared by the TIPS process. The process parameters are given in Table 5. The poly (ethylene chlorotrifluoroethylene) fibre sample was then placed in an aqueous solution of 5 wt % caustic to leach the silica from the membrane. The best result in terms of permeability was the Citroflex coated sample (11294 LMH) but had a low bubble point (110 kPa). The best result in terms of bubble point was the GTA coated sample (150 kPa).

TABLE 5

Coated Membranes With Silica

| Parameter | Value | | | |
|---|---|---|---|---|
| Solvent | GTA | | | |
| Coating | None | GTA | Digol, | Citroflex 2 |
| Lumen | 100% Digol | | | |
| Polymer Concentration | 21% | | | |
| Additives | 3% (of dope) Aerosil R972 delivered as a slurry in GTA | | | |
| Barrel Temperature | 230° C. | | | |
| Solvent injectors | 230° C. | | | |
| Throughput | 100 cc/min | | | |
| Screw speed | 1250 rpm | | | |
| Die Temperature | 200° C. | | | |

The dope was similar to that produced in the earlier trials. The most obvious difference was in opacity—with the silica included the dope was a cloudy white colour.

The fibre was extruded through a die at a temperature of approx. 200° C. into a water quench. The air gap was approximately 15 mm and the lumen liquid was diethylene glycol (digol).

Several different samples were taken. Some had no coating, others had GTA, Digol and Citroflex 2 coatings applied at two different production rates (30 and 60 m/min). The production parameters are shown in Table 6.

TABLE 6

Coated Membranes With Silica

| Parameter | No Coating | GTA | Digol | Citroflex 2 |
|---|---|---|---|---|
| % Polymer | 21 | 21 | 21 | 21 |
| % Aerosil R972 | 3 | 3 | 3 | 3 |
| Coating Flow (cc/min) | 0 | 10 | 10 | 10 |
| Lumen Flow (cc/min) | 5 | 5 | 5 | 5 |
| Permeability (LMH @ 100 kPa) | 0 | 1354 | 1564 | 3296 |
| Bubble Point (kPa) | 0 | 238 | >50 | 155 |
| Break Extension (%) | — | 118 | 52.3 | 71.1 |
| Break Force (N) | — | 1.81 | 1.30 | 0.86 |
| Force/unit area (MPa) | — | 3.63 | 3.74 | 4.67 |
| Fibre OD/ID (μm) | 624/356 | 968/550 | 783/414 | 614/385 |

The SEMs show that even with silica in the membrane the use of no coating agent resulted in the formation of a surface similar to a hollow fibre cast without silica. The appearance of the surfaces of the GTA and Citroflex hollow fibre membranes are similar, but the Citroflex coating gives a more open surface. This openness is reflected in the permeability and bubble point—the fibres coated with Citroflex have a much lower bubble point and a much higher permeability than the GTA coated samples. The GTA and Citroflex coated membranes with Aerosil had a permeability close to that of the corresponding hollow fibre membrane samples prepared without added silica.

The Digol coated samples have a very rough and inconsistent surface, as shown by the poor bubble point.

The samples described herein were are all prepared at a 30 m/min production rate. However, no significant difference was observed between 30, 60 and 100 m/min production rates in casting any of the samples.

The samples contain silica that can be leached from the fibres by the use of caustic soda (sodium hydroxide). Thus the effect upon the flow rate and bubble point was determined by leaching an uncoated sample, a GTA coated sample and a Citroflex coated sample in 5 wt % aqueous caustic solution at room temperature (23° C.). The Digol sample was omitted from this process due to its poor properties. Table 7 below gives fibre results and the SEMs of the leached fibres follow.

TABLE 7

Results for Leached Silica Poly (Ethylene Chlorotrifluoroethylene) Fibres

| Parameter | No Coating | GTA | Citroflex 2 |
|---|---|---|---|
| % Polymer | 21 | 21 | 21 |
| % Aerosil R972 | 3 | 3 | 3 |
| Coating Flow (cc/min) | 0 | 10 | 10 |
| Lumen Flow (cc/min) | 5 | 5 | 5 |
| Permeability (LMH @ 100 kPa) | — | 5867 | 11294 |
| Bubble Point (kPa) | — | 150 | 107 |
| Break Extension (%) | — | 115 | 81.0 |
| Break Force (N) | — | 1.67 | 0.98 |
| Force/unit area (MPa) | — | 3.36 | 5.43 |
| Fibre OID/ID (urn) | 624/356 | 968/550 | 614/385 |

Post-leaching SEMs of the fibres show some very impressive structures. All of the fibre cross sections are very open and in the case of the sample without coating, some asymmetry. The uncoated sample did not generate surface pores even after 5 days of leaching in the case of 3% silica, although this may be overcome by incorporating a higher silica content in the dope mixture. The surfaces of any fibres are not dramatically altered after leaching, but there is a significant change in the porosity and bubble point of the fibres.

The Citroflex coated samples post-leaching increased in flow by nearly 350% (3296 to 11294 LMH) but the bubble point of the fibres while already low dropped by 31% (154 down to 107 kPa). This is consistent with the SEMs. The GTA samples have been consistent with these results; the sample with Aerosil (pre-leaching) has lost a portion of its high bubble point (490 down to 238 kPa) whereas permeability is relatively unchanged with the addition of Aerosil—as would have been expected for the Citroflex sample.

Post-leaching however gave a dramatic 320% increase in the flow (1354 up to 5687 LMH) but a slightly larger drop in the bubble point of 37% (238 down to 150 kPa).

The mean of the break extension (BE) and break force (BF) results for the GTA and for the Citroflex coated samples were unchanged after 30–40 hrs leaching in 5%

NaOH at room temperature. This shows the polymer and resulting membrane resist caustic attack well.

The use of 3% silica was not sufficient to produce a hydrophilic membrane. However it nevertheless opens up the membrane structure and improve flows.

With higher silica content, up to around 6%, the flow and bubble point do not change dramatically from the results achieved with 3% Aerosil because the presence of the silica is most likely what induces the changes in the membrane structure, not these quantities. The surface of the fibre is also modified to get a better retention.

The use of post treatment agents in modifying the properties of ultrafiltration membranes is known. One such post treatment, involving soaking the Halar fibres in 50 wt % aqueous glycerol solution for 24 h was conducted. The results shown below in Table 8 compare Halar fibres otherwise identical apart from the glycerol soak. Soaking was seen to dramatically increase the permeability of the membrane, from being impermeable before treatment to having a permeability of 138 $Lm^{-2}h^{-1}$ at 100 Kpa.

TABLE 8

Post Soaking in Glycerol

| Parameter | Halar No Post Treatment | Halar 50% Aqueous Glycerol 24 h |
|---|---|---|
| Solvent | 100% GTA | 100% GTA |
| Coating | 100% GTA | 100% GTA |
| % Polymer | 21 | 21 |
| Coating Flow Rate (cc/min) | 2.5 | 2.5 |
| Lumen Flow Rate (cc/min) | 5 | 5 |
| Haul Off (m/min) | 80 | 80 |
| Permeability ($Lm^{-2}h^{-1}$) @ 100 kpa | No flow | 138 |
| Water Bubble Point (kPa) | >660 | >660 |
| HFE Bubble Point (kPa) | — | 200–250 |
| Break Extension (%) | 131 | 131 |
| Break Force (N) | 1.14 | 1.14 |
| Force/Unit Area (Mpa) | 6.82 | 6.82 |
| Fibre OD/ID | 539/278 | 539/278 |

The ability of membrane synthesis methods to be scaled up to production levels is important. The processes used to produce the large quantity of fibres must not only be operable on a small scale, they must also robust enough to be capable of being scaled up for use in a more typical production format, where solvent systems, die design and other production parameters need to be re optimised.

Trials were initially conducted on a system used for the commercial preparation of PVDF membranes by a TIPS process. The main differences were the use of PEG200 as the quench fluid, rather than water.

The production parameters are as shown in the following Table 9.

TABLE 9

Production Parameters

| Parameter | Value |
|---|---|
| Solvent | Citroflex 2 |
| Coating | Citroflex 2 |
| Lumen | 100% Digol |
| Polymer concentration | 21% |
| Barrel Temperature | 230° C. |
| Solvent injectors | 230° C. |
| Throughput | 100 cc/min |
| Screw speed | 250 rpm |
| Die Temperature | 230° C. |

As with the earlier trials, the extruder product was completely optically clear and homogeneous. The fibre was spun through a conventional TIPS die configurations at a temperature of 230° C., with a long (150 mm) stem in which Citroflex 2 coated the fibre. Finally the fibre emerged into a glass tube with PEG200 as the quenching media. There was no air gap and the lumen liquid was diethylene glycol (digol).

The Trial produced fibres having the properties as shown in Table 10.

TABLE 10

Citroflex 2 Coated Fibres

| Parameter | Citroflex 2 Coating |
|---|---|
| % Polymer | 21 |
| Coating Flow (cc/min) | 10 |
| Lumen Flow (cc/min) | 5 |
| Permeability (LMH @ 100 kPa) | 2596 |
| Bubble Point (kPa) | 400 |
| Break Extension (%) | 145.8 |
| Break Force (N) | 1.3 |
| Force/unit area (MPa) | 8.38 |
| Fibre OD/ID (um) | 626/439 |

The SEMs show a fibre with a morphology exhibiting a uniform cross section with a slight degree of asymmetry. Also apparent is a very coarse pore structure on the surface, with skinned areas in between. These skinned areas probably account for the some of the high break extension (BE).

This trial demonstrates that different quench liquids can be used to produce a membrane with an acceptable structure. This is facilitated by the fact that the Halar dope is very close to the cloud point, enabling the use of most types of non-solvent suitable to the process as a quench fluid giving slightly different structures. However as explained below, given the good structure with water—the cheapest non-solvent possible—it does not appear necessary to use another quench type.

A second trial was conducted with a similar dope using a triple head extruder as shown in FIG. 1b. It is particularly preferred if the die is of a stem configuration. In FIG. 1b, 13 is the coating fluid, 12 is the polymer solution (dope) and 11 is the lumen fluid. The stem can be of any length, but particularly is between 0.5 and 150 mm so that the coating covered the surface of the spun fibre evenly. The air gap, the distance between the die tip and the quench, can be any length but is most advantageously between 0 and 10 mm. The production parameters are shown in Table 11.

TABLE 11

Production Parameters

| Parameter | Value |
|---|---|
| Solvent | GTA, Citroflex 2 |
| Coating | GTA, Citroflex 2 |
| Lumen | 100% Digol |
| Polymer Concentration | 21% |
| Barrel Temperature | 230° C. |
| Solvent injectors | 230° C. |
| Throughput | 100 cc/min |
| Screw speed | 250 rpm |
| Die Temperature | 230° C. |

A plate was selected in preference to a long stem, the aim being to reduce the contact time between the coating fluid and the spun fibre. This was changed from 150 mm down to ~5 mm of plate plus a very small air gap (~5 mm) so that the coating contact time is a small as possible. Following this the fibre entered directly into a water quench. Both the temperature of the coating fluid and the total contact time have a significant effect upon the structure of the fibre surface.

The SEMs showed the fibres to exhibit a difference in the surface structure compared to the initial production trial. The temperature of the die and coating were far more accurately controlled in the present trials. The coating temperature in the second trial was 230° C.±5° C., roughly 100° C. above the coating temperature for the previous trials. This difference has a dramatic effect upon the membrane surface structure.

Several different samples were taken with GTA and Citroflex 2 coating at two different production rates (30 and 60 m/min). Samples with GTA as a solvent were only taken with a GTA coating and likewise for Citroflex 2. The results are shown in Table 12 and in the figures, which show representative examples of the membranes.

Figure 2A:
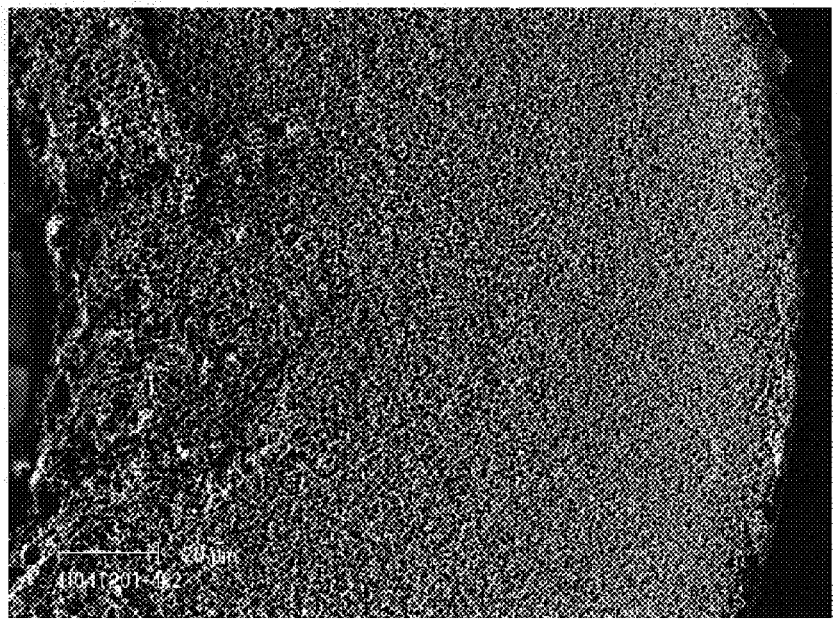
FIGS. 2a and 2b are Scanning Electron Micrographs of the membranes of the present invention.
Figure 2B:
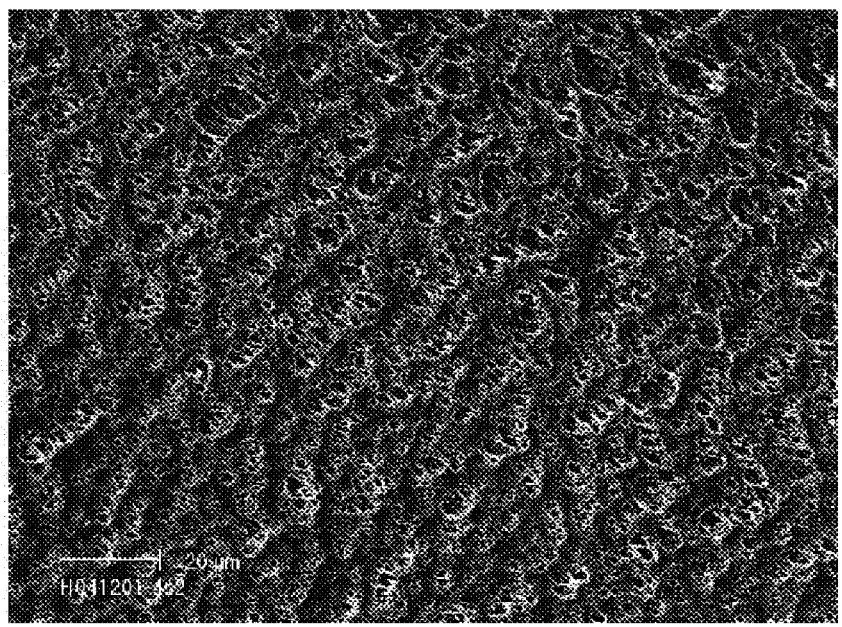

FIG. 2a is a SEM which shows a cross section of a Halar membrane prepared at a production rate of 60 m/min and coated with Citroflex at a rate of 7.5 cc/min. FIG. 2b shows a surface of the membrane.

Figure 3A:
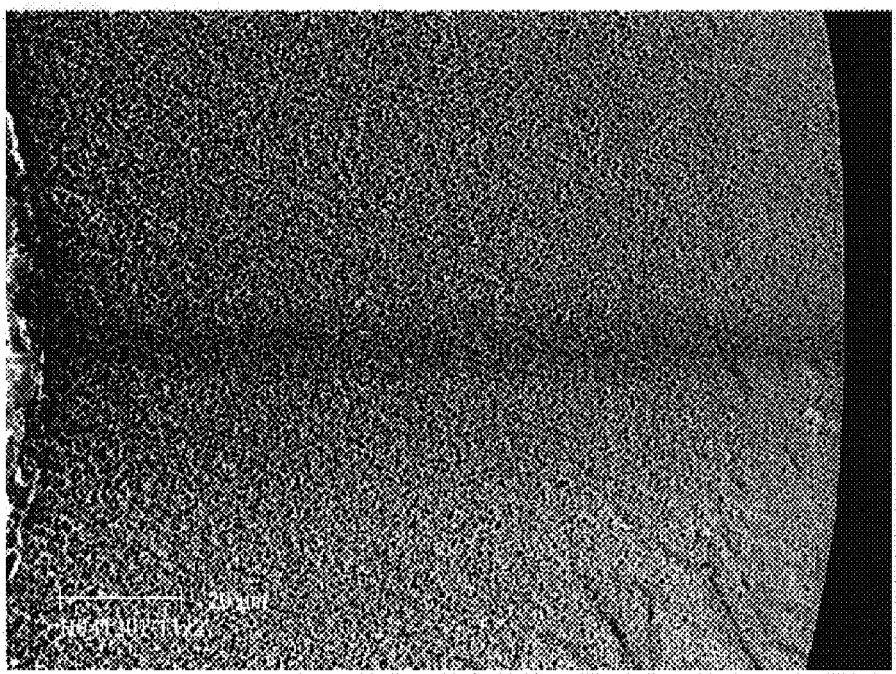
FIGS. 3a and 3b are Scanning Electron Micrographs of the membranes of the present invention.
Figure 3B:
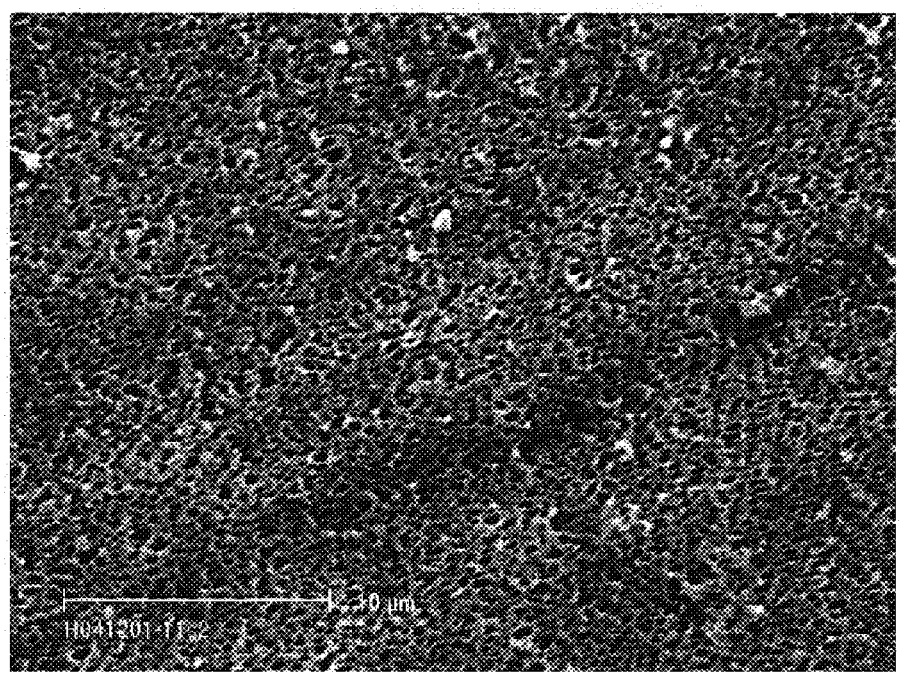

FIG. 3a is a SEM which shows a cross section of a Halar membrane prepared at a production rate of 80 m/min and coated with GTA at a rate of 2.5 cc/min. FIG. 2b shows a surface of the membrane.

point much lower (250–400 kPa) but a much higher permeability (2500–3500 LMH) than the GTA coated samples. Given a regular surface on the Citroflex fibres the bubble point could be increased and the permeability enhanced.

The GTA samples are permeable however, at all coating flow rates. The GTA samples all had water bubble points far higher than the porometer could measure—but estimated to be in the region 800–900 kPa. These samples appear more clearly asymmetric than the samples with the Citroflex 2 as the solvent/coating.

The samples were tested for their capability for ultrafiltration. Initial tests showed a HFE bubble point of between 200 and 300 kPa. This correlates to a membrane with pores approaching—if not already within—the UF range. Consequently one sample was tested for protein retention with Immuno Gamma Globulin (IGG, MW=120 kD). The sample tested was the first of the GTA coated samples with 1 cc/min of coating. The sample retained >95% of IGG, close to a known UF membrane possessing a retention of 98%.

These fibre samples were not treated with glycerol, as is standard practice for UF-style membranes. Glycerol prevents very small pores from collapsing upon drying the membrane. Some similar samples to those UF tested were soaked in Glycerol before drying to prevent any possible pore collapse. This enhanced the permeability of the membrane up to 138 LMH from 0, and explains the poor permeabilities in the UF tests.

TABLE 12

Production Properties of Coated Membranes

| Parameter | Citroflex 2 | | | | | GTA | | | | |
|---|---|---|---|---|---|---|---|---|---|---|
| % Polymer | 21 | | | | | 21 | | | | |
| Coating Flow (cc/min) | 5 | 7.5 | 10 | 5 | 7.5 | 1 | 2 | 5 | 2.5 | 2.5 |
| Lumen Flow (cc/min) | 5 | 5 | 5 | 5 | 5 | 5 | 5 | 5 | 5 | 5 |
| Hauloff (m/min) | 60 | 60 | 60 | 80 | 80 | 60 | 60 | 60 | 80 | 100 |
| Permeability ($LM^{-2}H^{-1}$ @ 100 kPa) | 2633 | 3515 | 3161 | 2366 | 3090 | 38 | 19 | 64 | — | 57 |
| Bubble Point (kPa) | 250 | 350 | 400 | 350 | 350 | >660 | >660 | >660 | >660 | >660 |
| Break Extension (%) | 66 | 53 | 29 | 42 | 57 | 185 | 184 | 168 | 131 | 132 |
| Break Force (N) | 0.96 | 0.84 | 0.71 | 0.74 | 0.69 | 1.36 | 1.26 | 1.45 | 1.14 | 1.26 |
| Force/unit area (MPa) | 6.78 | 3.63 | 4.35 | 2.49 | 2.07 | 4.87 | 7.50 | 5.20 | 6.82 | 7.56 |
| Fibre OD/ID (um) | 652/378 | 621/336 | 570/380 | 660/376 | 561/326 | 710/356 | 760/393 | 697/393 | 539/278 | 535/271 |

Unlike the results obtained in the initial trial, the surfaces here due to GTA and Citroflex are no longer similar and the Citroflex coating gives a less open surface, contrary to previous trials. This is most likely due to the increase in coating temperature, since at higher temperatures both the Citroflex 2 and GTA become more aggressive as a solvent. The Citroflex is most likely starting to re-dissolve some of the surface of the fibre before final precipitation is forced thus solidifying the structure.

The internal membrane structure also appears to be affected—the pores internally with Citroflex 2 as a solvent appear far coarser than those in the structure with a GTA solvent, whose pores appear very small and tightly packed. This is reflected in the permeability and bubble point—the fibres with Citroflex 2 as the solvent have a water bubble

TABLE 13

UF Results

| | | (i) GTA solvent/Coating 1 cc/min Coating |
|---|---|---|
| Sample | Time | LMH |
| Ethanol | 02:49:04 | 6.17 |
| clean water | 3:11:19.0 | 15.90 |
| 1 | 1:20:00.0 | 10.34 |
| 2 | 2:51:05.0 | 11.74 |
| 3 | 3:51:05.0 | 12.36 |

Figure 4:
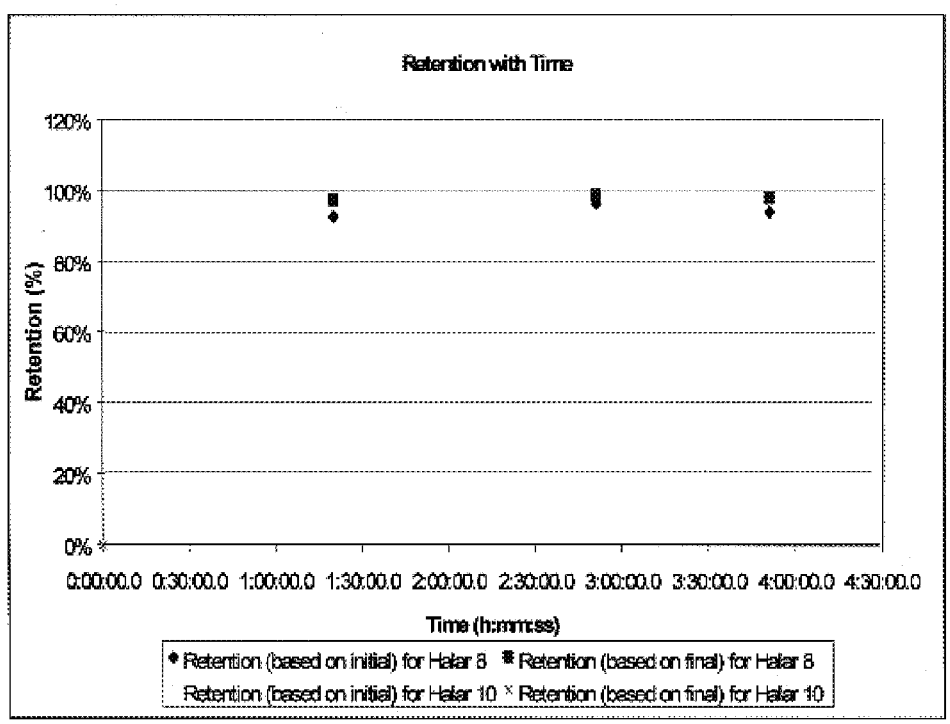
FIG. 4 shows the results of IGG filtration using the membranes of the present invention.

FIG. 4 shows protein retention over time on a Halar membrane coated with GTA at 1 cc/min.

Both Citroflex 2 and GTA samples at 80 m/min and the 100 m/min samples (GTA) production rate show very little difference from the corresponding 60 m/min samples in flow surface structure, and no difference is apparent in either % BE, BF or permeability.

Using GTA as a coating for the Halar fibres provides a remarkable amount of control over both the structure and porosity of the fibre surface. A lower coating flow rate still seems to keep the fibre permeable and enhances the asymmetry, whereas a higher coating flow rate gives a far more open surface. It is interesting is that the permeability of the 1 cc/min samples is not vastly different from the 5 cc/min samples, yet the fibre surface appears far less porous. This suggests that the internal pore size is very small. Thus if the surface porosity is controlled accurately then either the polymer concentration can be decreased or Citroflex 2 used as a solvent to increase the permeability, all while maintaining excellent bubble point/retention characteristic of the fibre.

Flat Sheet Preparation

Approximately 160 g of solvent (GTA or Citroflex 2) was placed into a glass reaction vessel with a thermocouple to control the temperature. Stirring continuously, the solvent was heated to 230° C. before approximately 40 g of Halar 901LC was added to the vessel. The polymer dissolved rapidly and was allowed to mix for 10–15 minutes before a sample of polymer solution was poured from the flask and onto a glass plate preheated to 120° C. The dope was then rapidly spread across the plate with a glass bar also preheated to 120° C. The bar had adhesive tape wound around the ends to raise it a uniform height above the plate when drawing the dope down, thus a sheet of uniform thickness was obtained. The cast membrane rapidly cooled and solidified to form a flat membrane sheet, which was washed in ethanol and dried in air.

Virus Retention Results

A sample of Halar hollow fibre membranes were prepared in accordance with the methods disclosed herein. The sample was prepared from a dope containing Halar 901LC at a concentration of 21%, with a coating flow of 0.3 ml/min. The coating, the solvent and the lumen were all GTA. The quench was in water at 15° C.

Dextran Retention

Three to four fibres approximately 10 cm long were made into a loop and the cut ends sealed in epoxy glue. 148 kd Molecular weight Dextran was filtered through this potted fibre. The feed & filtrate concentration was measured using HPLC and the percentage dextran retained by the fibre was calculated. Approximately 25% of the dextran was retained.

Virus Retention

In a similar fashion, three to four fibres approximately 10 cm long were made into a loop and the cut ends sealed in epoxy glue. A solution of MS2 type virus, at a feed concentration of approximately 30000 units per ml was filtered through this potted fibre. The log retention of virus was calculated and determined to be 4.30. Typically, a membrane having a viral log reduction of value of greater than 4 is considered to be an ultrafiltration membrane.

Permeability Test

The permeability of the fibres from the same batch as used for the dextran and virus retention tests was also determined. Three to four looped and potted 10 cm fibres were tested for permeability on a "porometer". The porometer allows water to be filtered at 100 kPa pressure from the outside of the fibres to the inside and out through the fibre ends. The time required to pass 10 ml of water is recorded and used to calculate the permeability in litres/meter².hour, which in the present case was determined to be 300 litres/meter².hour.

The dextran, virus and permeability test were reproduced on a second batch of Halar hollow fiber membranes prepared under identical conditions and identical results were obtained, suggesting that there were no reproducibility problems in the use of Halar to make ultrafiltration and microfiltration membranes.

Halar on its own forms a particularly good membrane with an excellent bubble point and clean water permeability combined. The addition of coatings and silica adds another dimension to the membrane properties.

While the invention has been described with reference to particular embodiments, it will be understood by those skilled in the art that the inventive concept disclosed herein is not limited only to those specific embodiments disclosed.

What is claimed is:

1. A porous polymeric membrane, the membrane comprising poly(ethylene chlorotrifluoroethylene) and silica, wherein the porous polymeric membrane further comprises a coating comprising a coating agent comprising at least one compound according to formula I or formula II:

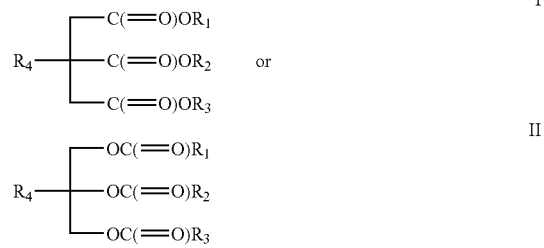

wherein $R_1$, $R_2$, and $R_3$ are alkyl; $R_4$ is selected from the group consisting of H, OH, $COR_5$, $OCOR_5$, alkyl, and alkoxy; and $R_5$ is alkyl.

2. The porous polymeric membrane according to claim 1, wherein $R_1$, $R_2$, and $R_3$ are independently selected from the group consisting of methyl, ethyl, propyl, butyl, pentyl, and hexyl;

$R_4$ is selected from the group consisting of H, OH, $COR_5$, $OCOR_5$, methyl, ethyl, propyl, butyl, pentyl, hexyl, methoxy, ethoxy, propoxy, butoxy, pentoxy, and hexoxy; and $R_5$ is selected from the group consisting of methyl, ethyl, propyl, butyl, pentyl, and hexyl.

3. The porous polymeric membrane according to claim 1, formed as a microfiltration membrane or an ultrafiltration membrane.

4. The porous polymeric membrane according to claim 1, wherein $R_1$, $R_2$, and $R_3$ are each ethyl, and wherein $R_4$ is H.

5. The porous polymeric membrane according to claim 1, wherein the compound of formula I or formula II is an environmentally friendly pore controlling agent.

6. The porous polymeric membrane according to claim 1, wherein the compound of formula I is citric acid ethyl ester.

7. The porous polymeric membrane according to claim 1, wherein the compound of formula II is glycerol triacetate.

8. The porous polymeric membrane according to claim 1, having a permeability of greater than 138 $Lm^{-2}\ h^{-1}$ at an applied pressure of about 100 Kpa.

9. The porous polymeric membrane according to claim 1, having a good macroscopic integrity.

10. The porous polymeric membrane according to claim 1, having uniform wall thickness.

11. The porous polymeric membrane according to claim 1, having a break force of greater than 0.86 N.

* * * * *